(12) United States Patent
Posarelli et al.

(10) Patent No.: US 9,434,148 B2
(45) Date of Patent: Sep. 6, 2016

(54) DEVICE FOR THE FINE WEEDING OF A MULTILAYER SHEET COMPRISING A SUPPORT LINER AND AT LEAST ONE ADHESIVE FILM COUPLED WITH THE LINER

(71) Applicant: Esanastri S.r.l., Calcinaia (Pisa) (IT)

(72) Inventors: Roberto Posarelli, Pisa (IT); Giuliano Vegni, Pisa (IT); Giorgio Dinelli, Lucca (IT); Cesare Stefanini, Pisa (IT); Federico Carnasciali, Pisa (IT)

(73) Assignee: ESANASTRI S.R.L., Calcinaia (Pisa) (IT)

( * ) Notice: Subject to any disclaimer, the term of this patent is extended or adjusted under 35 U.S.C. 154(b) by 0 days.

(21) Appl. No.: 14/437,319

(22) PCT Filed: Oct. 23, 2013

(86) PCT No.: PCT/IB2013/059573
§ 371 (c)(1),
(2) Date: Apr. 21, 2015

(87) PCT Pub. No.: WO2014/068449
PCT Pub. Date: May 8, 2014

(65) Prior Publication Data
US 2015/0283799 A1 Oct. 8, 2015

(30) Foreign Application Priority Data

Oct. 29, 2012 (IT) ................ FI2012A0233

(51) Int. Cl.
*B32B 38/10* (2006.01)
*B32B 43/00* (2006.01)
(Continued)

(52) U.S. Cl.
CPC .......... *B32B 43/006* (2013.01); *B25J 15/0028* (2013.01); *B25J 15/0033* (2013.01); *B25J 15/0057* (2013.01); *B25J 15/0475* (2013.01);
(Continued)

(58) Field of Classification Search
CPC ................ B32B 38/10; B32B 43/006; Y10T 156/1168; Y10T 156/1195; Y10T 156/1994
USPC .......................... 156/714, 719, 767
See application file for complete search history.

(56) References Cited

U.S. PATENT DOCUMENTS 3,695,981 A * 10/1972 Boucris .................. B65C 11/00
156/510
4,046,298 A * 9/1977 Schroeder, Jr. ......... G02B 6/245
156/714

(Continued)

FOREIGN PATENT DOCUMENTS

EP 0402001 A1 12/1990
EP 0470645 A1 2/1992

OTHER PUBLICATIONS

International Search Report dated Apr. 2, 2014 for PCT/IB2013/059573.

*Primary Examiner* — Mark A Osele
*Assistant Examiner* — Nickolas Harm
(74) *Attorney, Agent, or Firm* — Lucas & Mercanti, LLP

(57) ABSTRACT

The present invention concerns the field of graphic apparatuses and in particular its object is an apparatus for the so-called "weeding" of plastic or paper films having or more self-adhesive, double sided adhesive or electrostatic layers coupled with a support liner treated with a non-stick agent. The apparatus comprises a gripper (3) with a pinching head (8) comprising a plurality of self-centering jaws (16).

12 Claims, 16 Drawing Sheets

(51) Int. Cl.
  *B25J 15/00* (2006.01)
  *B25J 15/04* (2006.01)
  *B25J 15/10* (2006.01)
  *B25J 19/00* (2006.01)
  *B44C 1/16* (2006.01)

(52) U.S. Cl.
  CPC ............ *B25J 15/10* (2013.01); *B25J 19/0091* (2013.01); *B32B 38/10* (2013.01); *B44C 1/16* (2013.01); *B32B 2451/00* (2013.01); *B32B 2519/00* (2013.01); *Y10T 156/1168* (2015.01); *Y10T 156/19* (2015.01); *Y10T 156/195* (2015.01); *Y10T 156/1994* (2015.01)

(56) References Cited

U.S. PATENT DOCUMENTS

| | | | | |
|---|---|---|---|---|
| 4,599,037 A * | 7/1986 | Ross, Jr. | | B25J 15/0616 29/740 |
| 4,685,991 A * | 8/1987 | Herrmann | | B26D 3/282 156/701 |
| 4,753,004 A * | 6/1988 | Fujioka | | H01L 21/6838 29/740 |
| 4,956,044 A * | 9/1990 | Watanabe | | B29C 63/0013 156/350 |
| 5,022,951 A * | 6/1991 | Behlmer | | B65C 9/0006 156/379 |
| 5,106,138 A * | 4/1992 | Lawson | | B25J 15/0253 29/743 |
| 5,368,678 A * | 11/1994 | Miyamoto | | B29D 30/0016 156/405.1 |
| 5,524,166 A * | 6/1996 | Osaka | | G02B 6/4403 385/114 |
| 5,591,181 A * | 1/1997 | Stone | | A61B 17/0469 206/239 |
| 6,126,658 A * | 10/2000 | Baker | | A61B 18/1445 606/38 |
| 6,126,665 A * | 10/2000 | Yoon | | A61B 17/0469 606/144 |
| 6,227,276 B1 * | 5/2001 | Kim | | B29C 63/0013 156/247 |
| 6,263,941 B1 * | 7/2001 | Bryan | | B28D 5/0011 156/239 |
| 6,623,482 B2 * | 9/2003 | Pendekanti | | A61B 18/1445 606/170 |
| 7,189,233 B2 * | 3/2007 | Truckai | | A61B 18/1442 606/49 |
| 7,208,005 B2 * | 4/2007 | Frecker | | A61B 17/29 606/167 |
| 7,232,738 B2 * | 6/2007 | Rayssac | | B28D 5/0011 156/762 |
| 8,147,489 B2 * | 4/2012 | Moses | | A61B 17/3201 606/49 |
| 8,245,754 B2 * | 8/2012 | Fujita | | B32B 38/10 156/714 |
| 8,266,783 B2 * | 9/2012 | Brandt | | A61B 18/1442 29/527.1 |
| 2004/0250397 A1 * | 12/2004 | Jin | | B08B 1/04 29/403.1 |
| 2007/0204955 A1 * | 9/2007 | Manners | | E04G 23/006 156/763 |
| 2008/0245483 A1 * | 10/2008 | Toyoshima | | B32B 43/006 156/763 |
| 2009/0159207 A1 * | 6/2009 | Currie | | B29C 33/485 156/709 |
| 2009/0211710 A1 * | 8/2009 | Yamamoto | | H01L 21/67132 156/379.8 |
| 2009/0239156 A1 * | 9/2009 | Andritzke | | G03F 1/64 430/5 |
| 2009/0261804 A1 * | 10/2009 | McKenna | | A61B 18/1442 324/71.1 |
| 2009/0314430 A1 * | 12/2009 | Nakamura | | H01L 21/67011 156/703 |
| 2010/0228249 A1 * | 9/2010 | Mohr | | A61B 19/2203 606/41 |
| 2011/0073246 A1 * | 3/2011 | Brandt | | A61B 18/1445 156/242 |
| 2012/0010614 A1 * | 1/2012 | Couture | | A61B 18/1445 606/45 |
| 2012/0312458 A1 * | 12/2012 | Auton | | B65C 9/0006 156/212 |

* cited by examiner

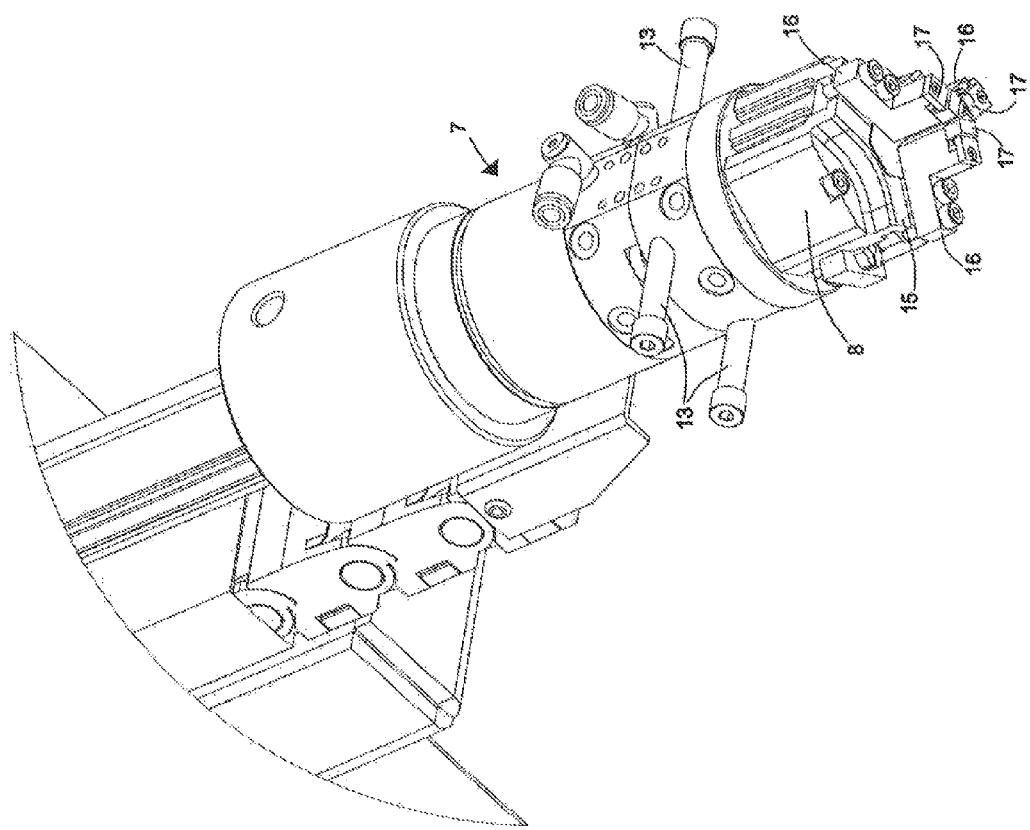

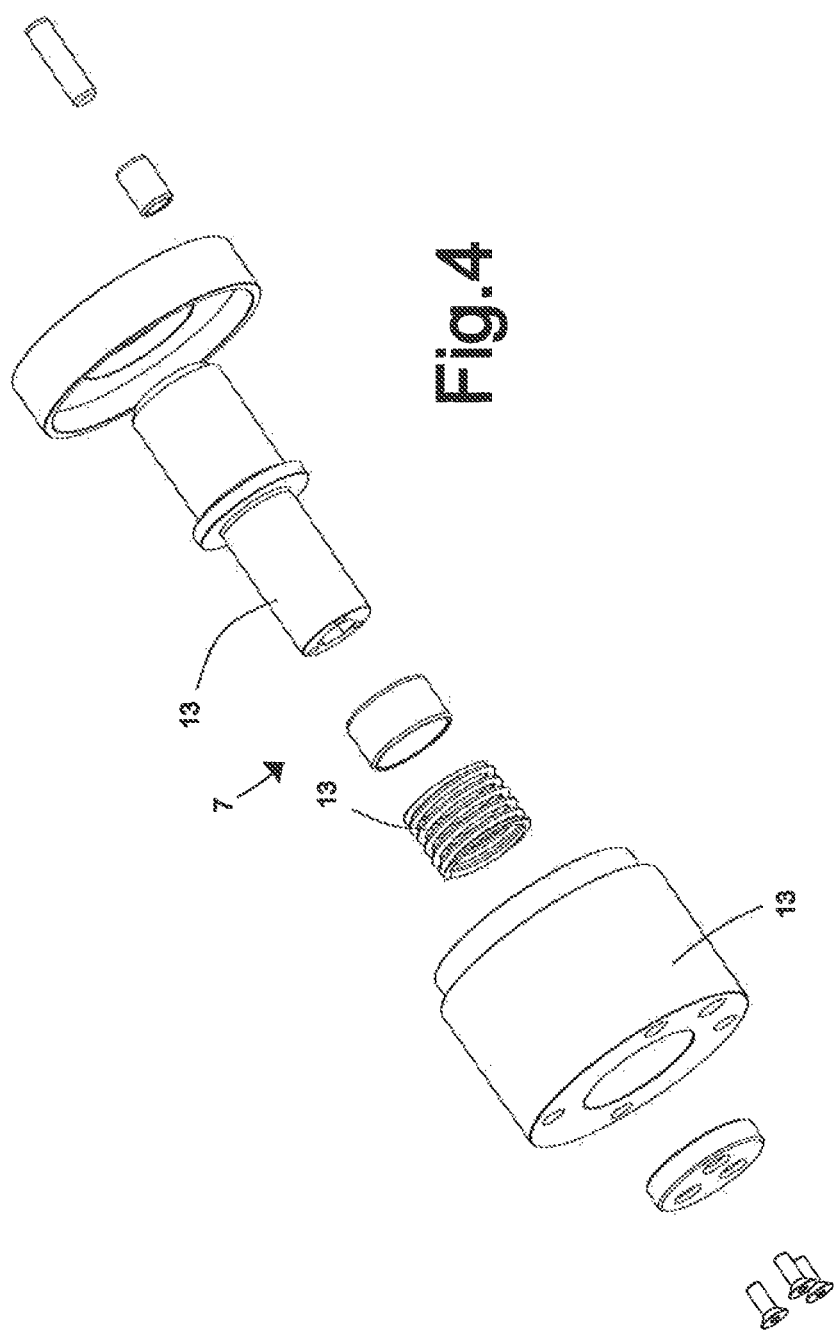

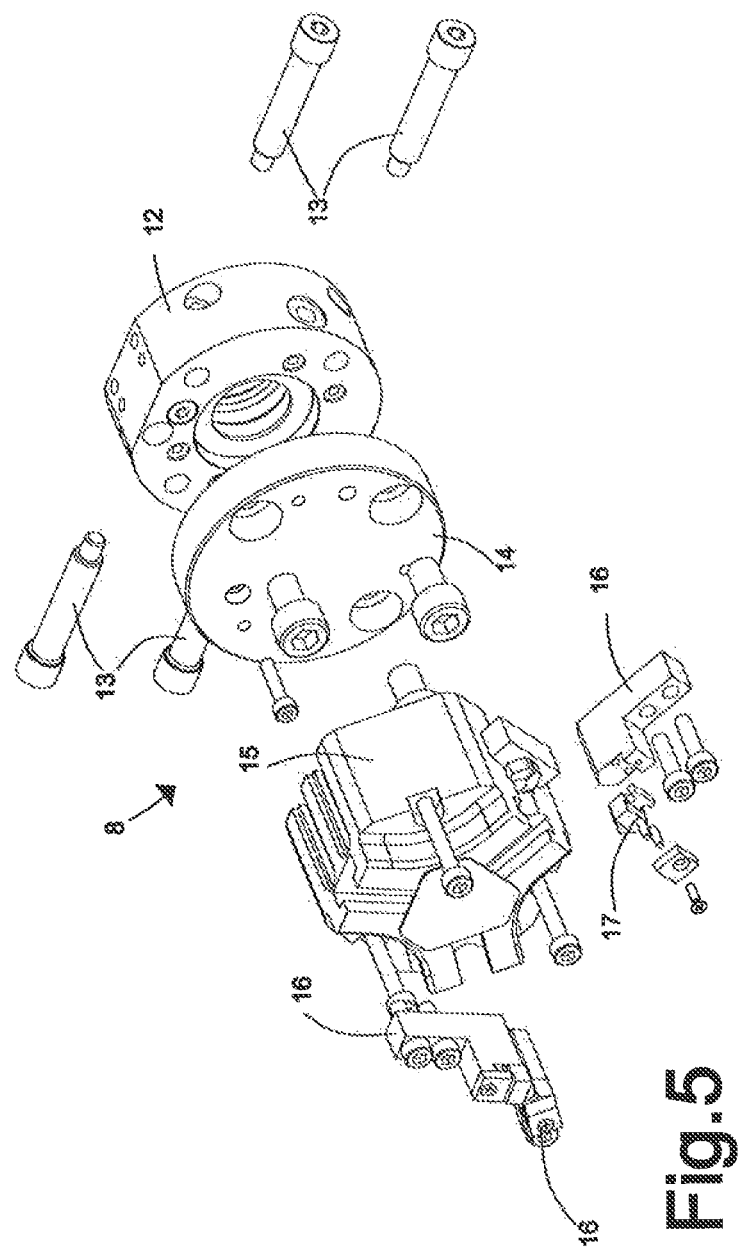

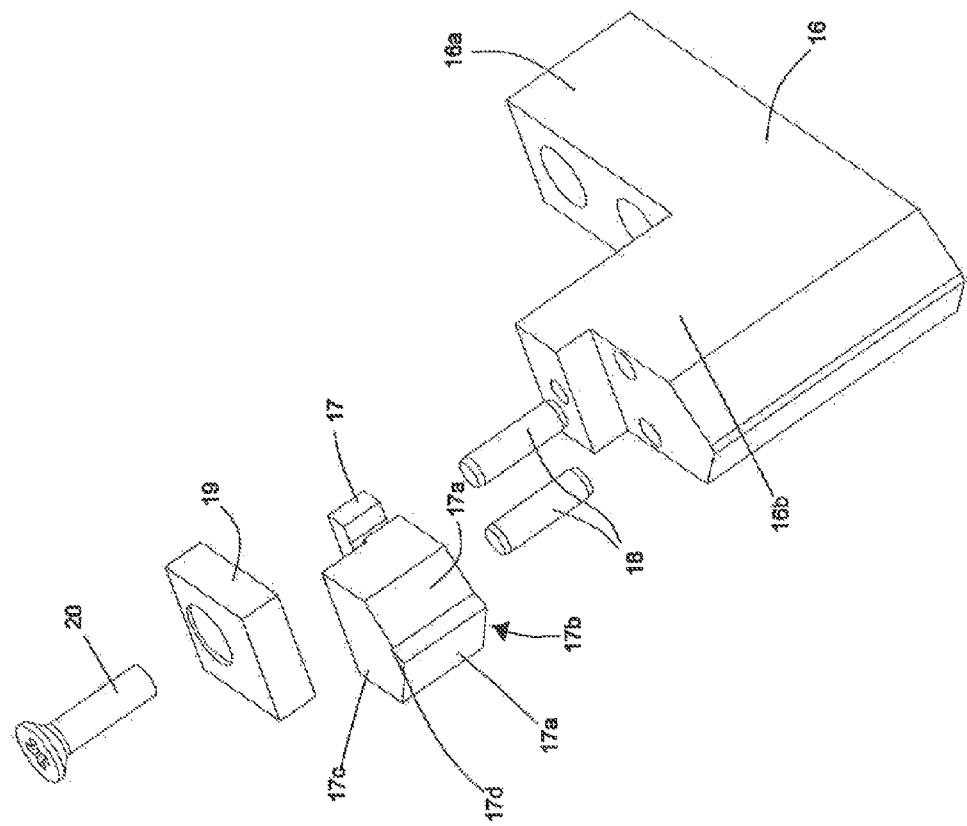

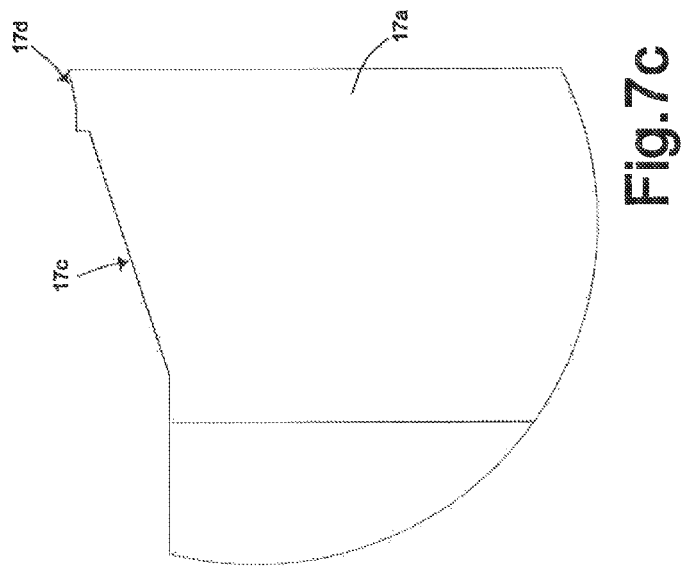
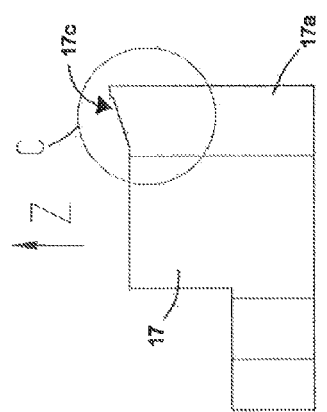
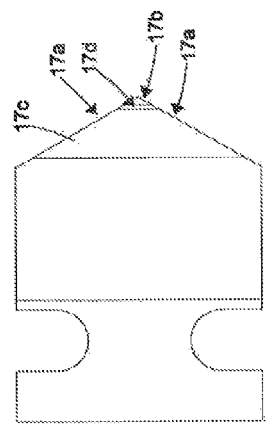

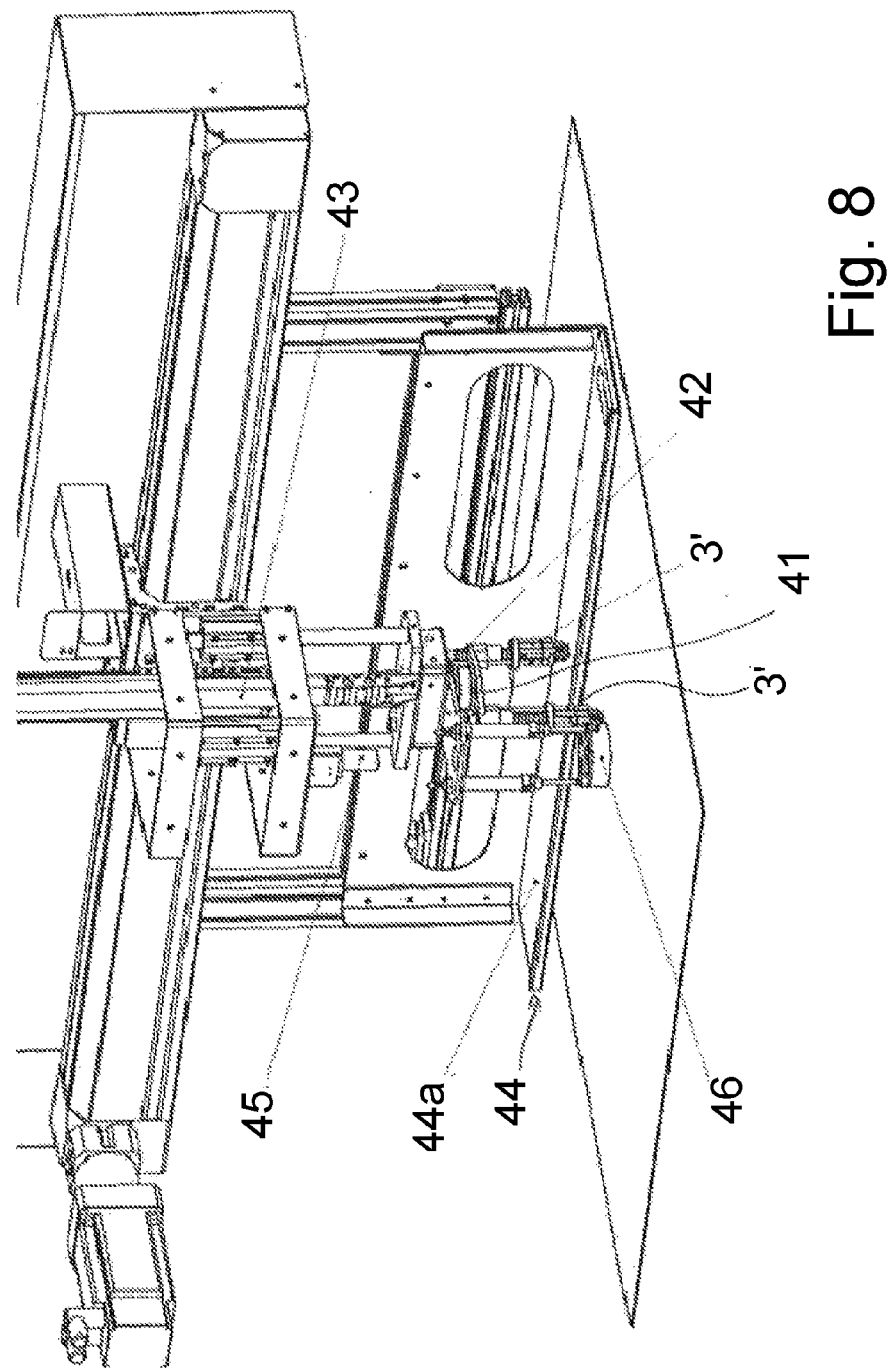

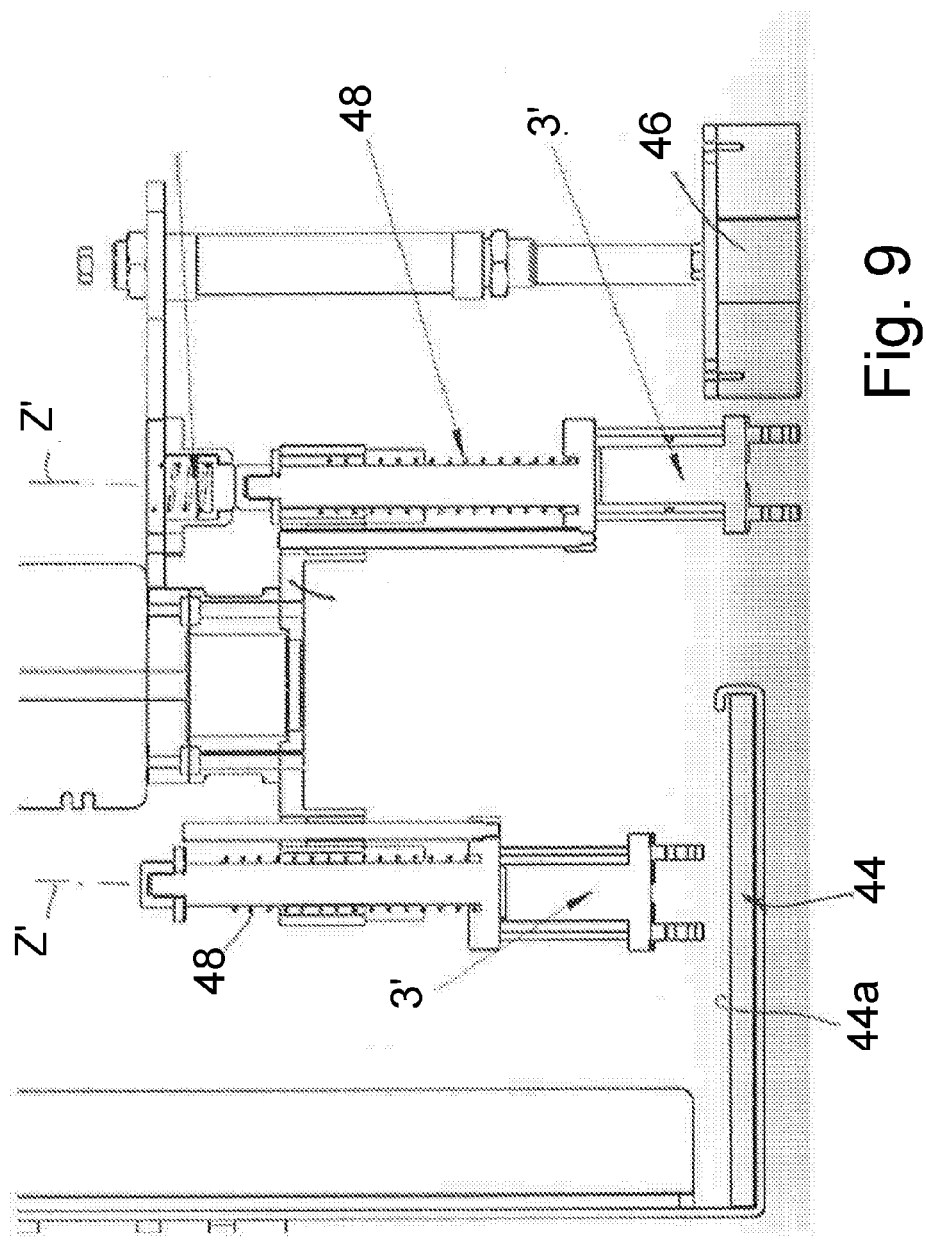

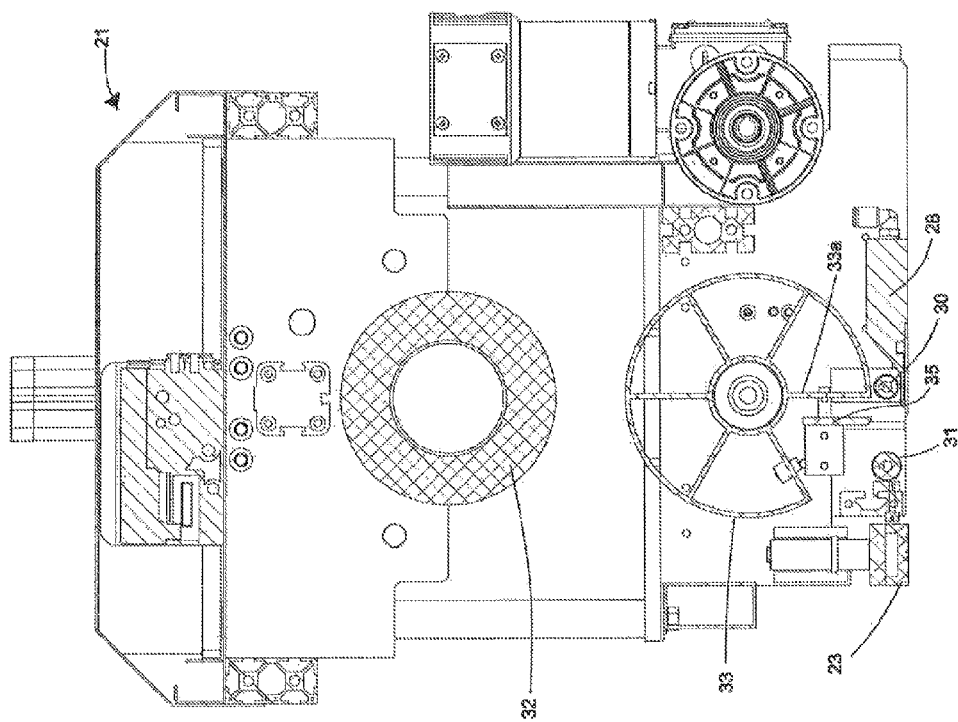

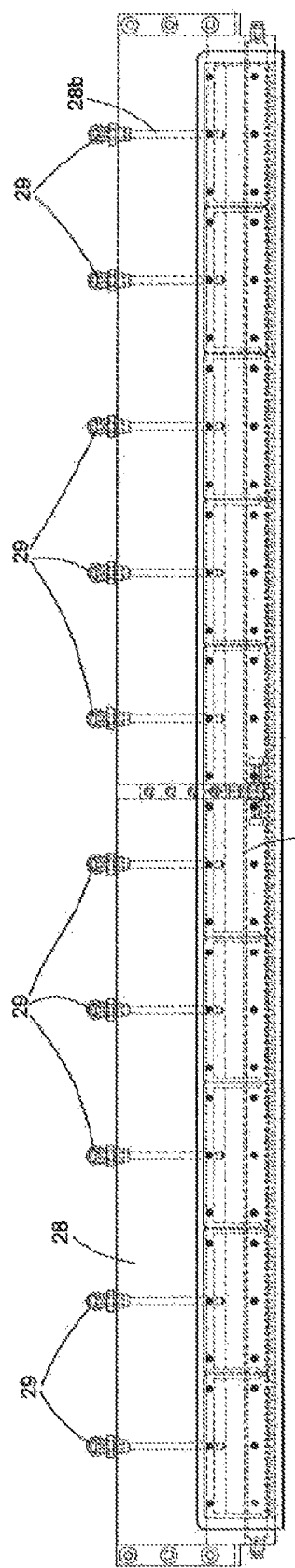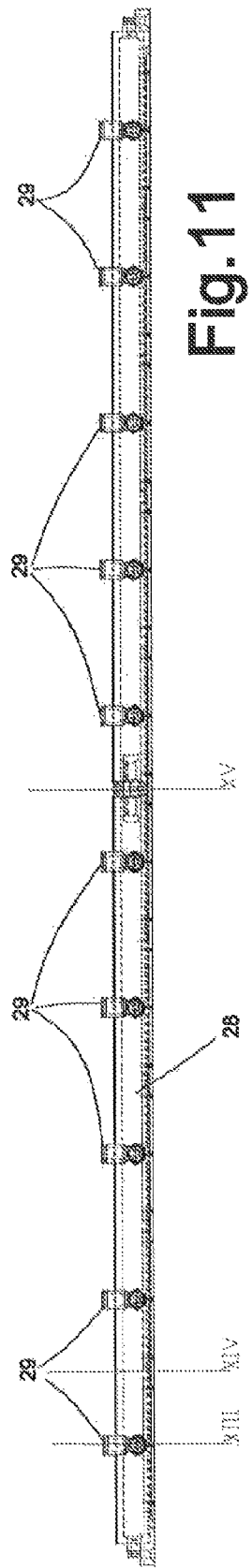

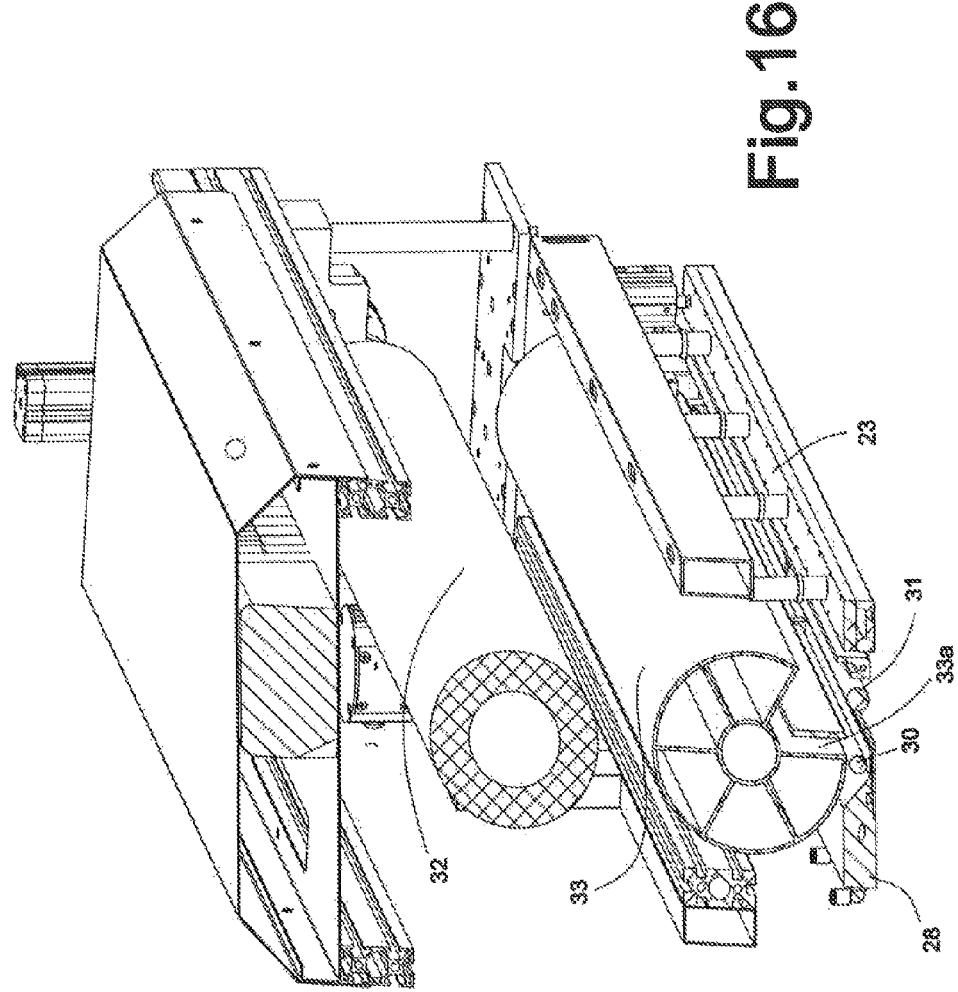

DEVICE FOR THE FINE WEEDING OF A MULTILAYER SHEET COMPRISING A SUPPORT LINER AND AT LEAST ONE ADHESIVE FILM COUPLED WITH THE LINER

CROSS-REFERENCE TO RELATED APPLICATION

This application is a 371 of PCT/IB2013/059573, filed Oct. 23, 2013, which, in turn claimed the priority of Italian Patent Application No. FI2012A000233 filed on Oct. 29, 2012, both applications are incorporated herein by reference.

DESCRIPTION

TECHNICAL FIELD OF THE INVENTION

The present invention concerns the field of graphic apparatuses and in particular its object is an apparatus and a relative method for the so-called "weeding" of plastic or paper films having or more self-adhesive, double sided adhesive or electrostatic layers coupled with a support liner treated with a non-stick agent.

BACKGROUND OF THE INVENTION

In the preparation of adhesive graphics, simply decorative or also having a protective function, obtained through various printing or through simple engraving processes, a distribution of single graphics is obtained on a single sheet comprising films of the type indicated above, printed and/or cut, coupled with a supporting silicone release paper, or liner. A cutting machine thus has the function of cutting the fringes of the various programmed drawings or writings only on the film, without however cutting also the support/release paper. At this stage there is the need of removing the "weeds", that is, the parts of adhesive film which are not processed and are therefore outside the graphics. In fact, the subsequent user, for his production requirements, needs to have a sheet in which there are only the graphics on the support paper, so that the same graphics can be easily removed and applied as desired.

Such a removal operation of the superfluous film, on the whole also called "weed" for the sake of simplicity, is in fact called weeding. This is a very onerous operation and at the same time delicate since, especially when the contours of the graphics have irregular shapes, or in any case they have indentations or acute curves or undercuts (situation which occurs even with simple alphanumerical characters), the film of weed to be removed tends to tear, leaving residues, or to pull away also the graphical part that should instead be left unaltered. There are also often small parts, typically the internal hollows of characters and writings in general, which require operations that are accurate, precise and repeated.

Such an operation is currently carried out in a completely manual manner, with serious affection of the production time and on labor costs. Automation of the weeding process, despite the attempts made, has been found to be problematic, indeed for the difficulties mentioned above, furthermore enhanced by the fact that the different graphics to be treated and their distribution demand requirements that are always different.

SUMMARY OF THE INVENTION

The present invention, on the other hand, provides a response to this strongly felt need, by providing a series of surprisingly effective technical expedients that make possible to achieve a weeding system that obtains a fully effective result, capable of replacing the manual methods currently in use, with consequent remarkable advantages.

The essential features of a fine weeding device according to the invention are defined in annexed claim 1. Other advantageous features, in connection with preferred or in any case effective embodiments, are the subject of the different dependent claims.

BRIEF DESCRIPTION OF THE DRAWINGS

Characteristics and advantages of the fine weeding device according to the present invention will become apparent from the following description of embodiments thereof, made purely by way of example and not limitative, with reference to the attached drawings in which:

FIG. 3 is an axonometric view from below of a gripper of a fine weeding device that according to the invention is included in the apparatus;

FIGS. 4 and 5 are axonometric exploded views of respective parts of the gripper of FIG. 3, in particular a damper and a pinching head;

FIG. 6 is an exploded view of a radial jaw of the pinching head of FIG. 5;

FIGS. 7a and 7b show respectively from a side and from above a pinching block of the jaw of FIG. 6;

FIG. 7c is an enlarged detail of the inside of circle C of FIG. 7a;

FIG. 8 and FIG. 9 schematically depict, respectively in an axonometric view and in front view, a fine weeding device according to a different embodiment of the invention;

FIG. 10 is a sectional view taken along a longitudinal plane of the apparatus of a seizing head of a rough weeding device;

FIGS. 11 and 12 are, respectively, a front view and a top plan view of a blower of the rough weeding head of FIG. 10;

FIG. 16 is further representation, in this case partial, schematic, broken and axonometric, of the rough weeding head.

DETAILED DESCRIPTION OF THE INVENTION

With reference to said figures, an apparatus according to the invention is intended to automatically remove the weed, which advantageously undergoes a pre-emptive cutting operation, with suitably positioned assisting cuts that are added to the conventional ones that define the periphery/outline of the various graphic elements. The cuts, carried out with conventional plotters, in turn have the characteristic of cutting the self-adhesive, adhesive or electrostatic, plastic or paper film, without affecting the support paper or liner. The present invention concerns the actual weeding apparatus, per se provided with novel and advantageous structural and functional characteristics.

The apparatus comprises a frame 1 equipped with a top plane 1a on which through known pneumatic systems the sheets of material to be weeded are fed and moved forward.

Upstream of the plane there is arranged a feeder 2, advantageously having a lifting surface, with a motorised control, on which to position the sheets with dimensions that can vary from 200×300 mm to 1000×1400 mm or also reels having corresponding size. The plane 2a of the feeder can comprise, along two consecutive sides, mechanical abutments that are suitable for allowing a reference of the sides of the sheet, the so-called "print register" sides. This, along with the control of the height of the plane, ensures that when a stack of sheets is arranged on the plane, the sheet on top, intended to be processed, is always positioned perfectly with respect to the work plane 1a of the frame 1.

Figure 1:
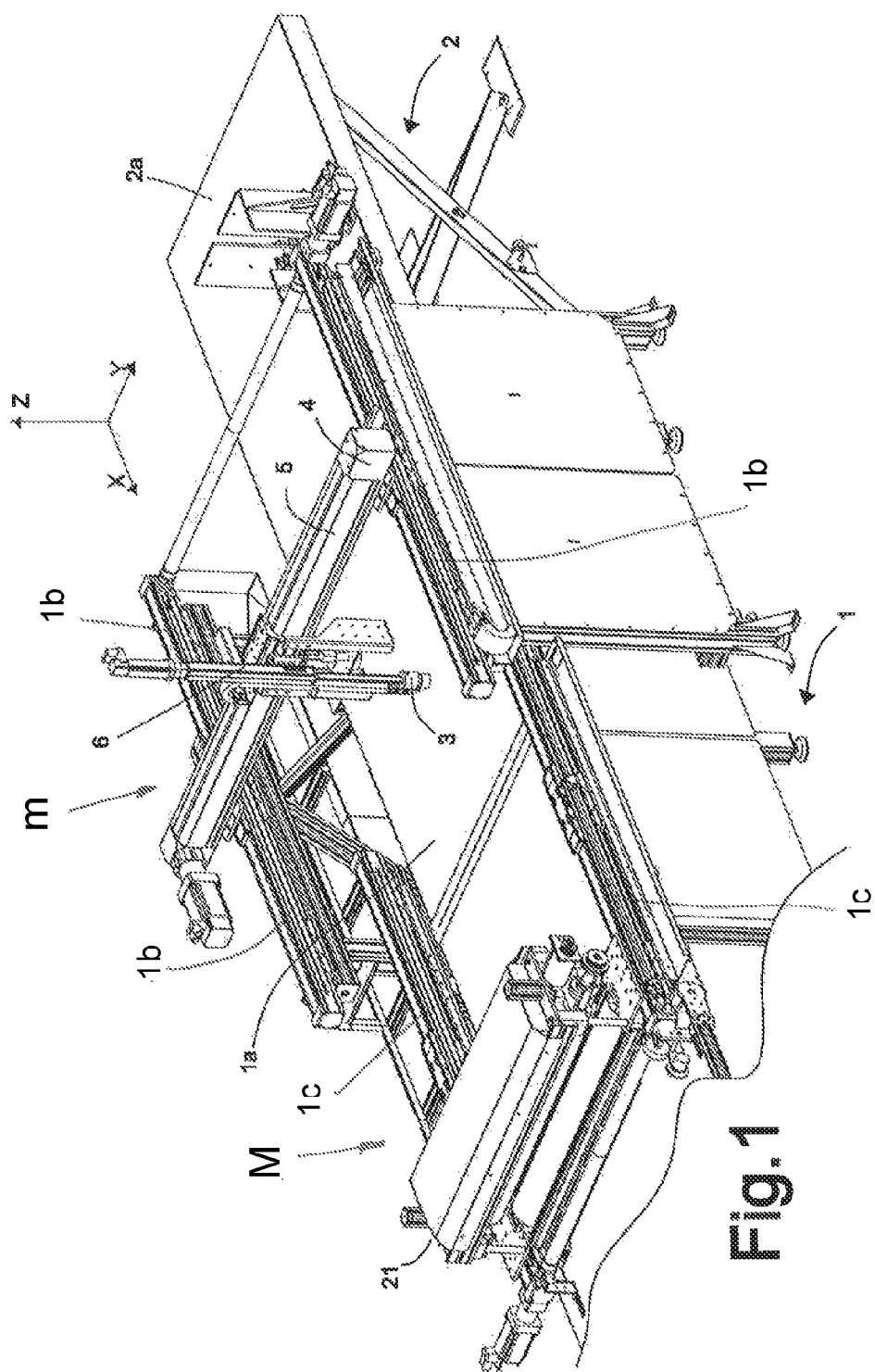
FIG. 1 is a schematic axonometric view of an automatic weeding apparatus.
Figure 2:
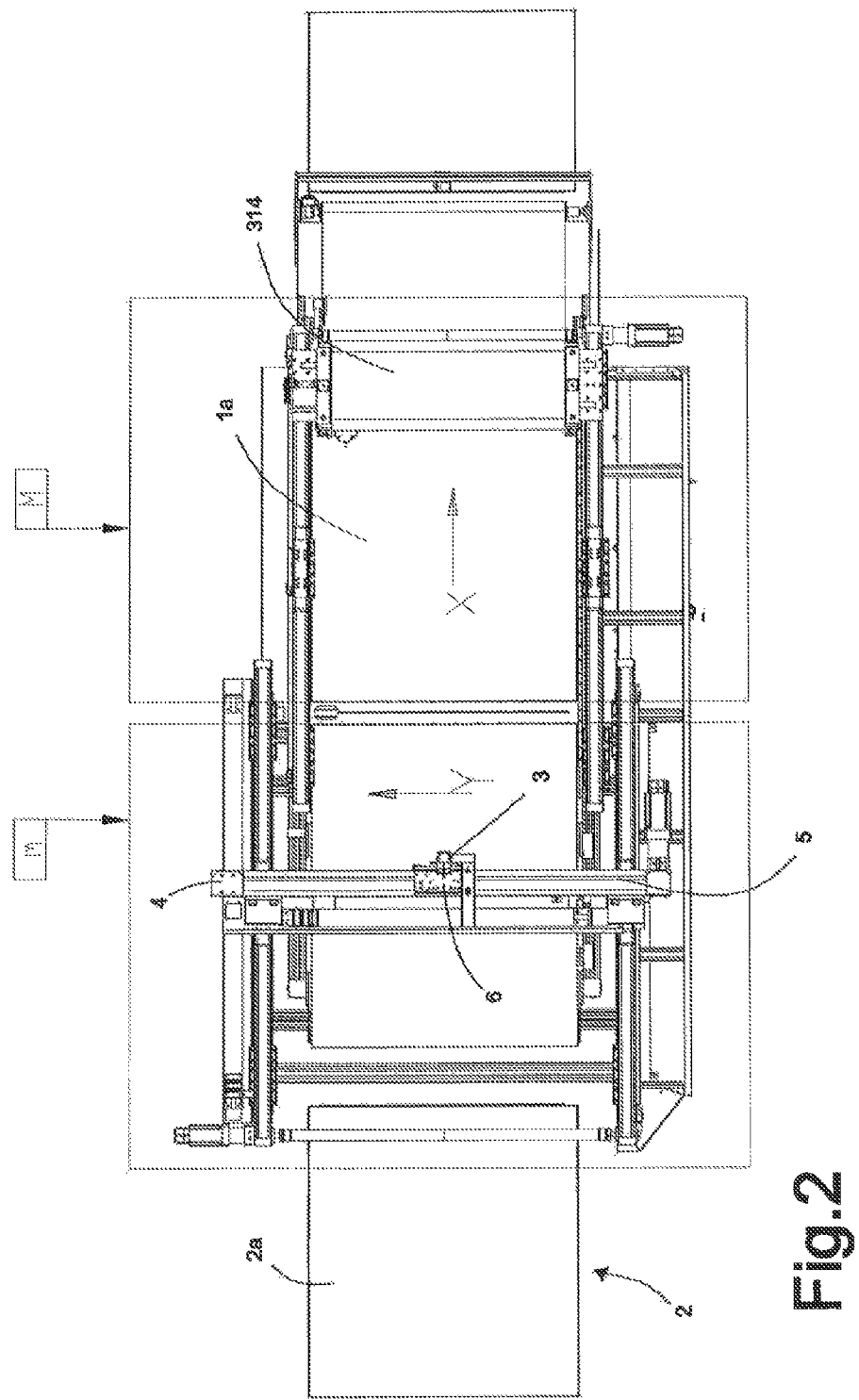
FIG. 2 is a top plan view of the apparatus.
Figure 13:
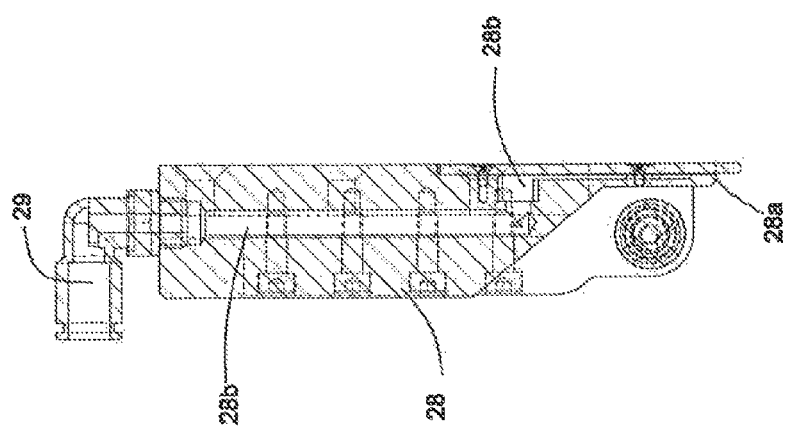
FIGS. 13 to 15 are cross-section views of the blower in the previous figures, taken respectively along the lines XIII, XIV e XV of FIG. 11.
Figure 14:
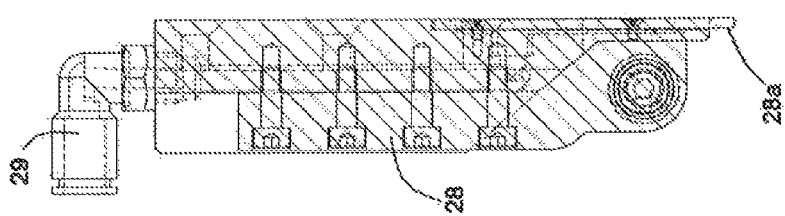
Figure 15:
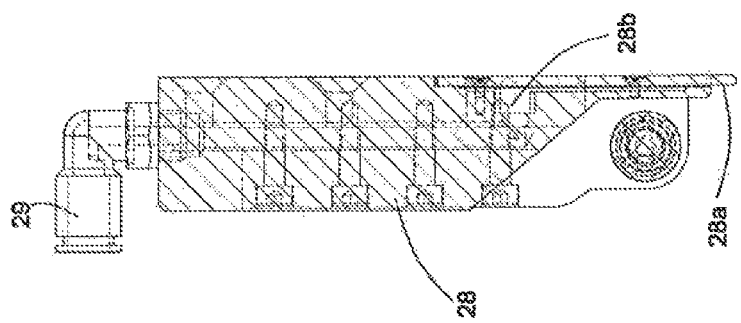

A first part of the plane 1a, taking as a reference the advancement direction of the material indicated with the arrow X of FIG. 2, represents a fine weeding station m, that is a station of fine removal of small parts of weed, including those parts that are generated by a plurality of weeding assisting cuts. Once the fine weeding has been carried out, the main body of the weed (through a rough weeding station/process M which will be described in greater detail hereafter) can be detached completely and effectively, without leaving residues, without tearing material or removing undesired parts.

A fine weeding device operates at the fine weeding station m (FIG. 2), with a gripper 3 that a portal 4 supports in a vertical arrangement, allowing the gripper to move along the three coordinates XYZ, in which the plane XY is the one parallel to the plane 1a and the axis Z is the direction along which the gripper 3 extends.

To such a purpose the portal 4 has a crosspiece 5 which can be displaced along the advancement direction X and along which a carriage 6 moves, in accordance with the direction Y, and in turn supports the fine weeding gripper 3 through a linear actuation system along the direction Z. All such movements, just like those that are not specified otherwise, are controlled by motorizations implemented as obvious to a person skilled in the art. It is in any case worth noting how the movement along Z of the gripper 3 is advantageously carried out by means of a recirculating ball system driven by a direct brushless motor that ensures speed and precision with a repeatability in the order of a hundredth of a millimetre.

The portal 4 also has a suction rod, which is not visible in the figures, which through a suction pad system feeds the sheet and arranges it so as to align the front left corner (imagining an observer which is standing looking towards the same direction as the advance movement direction) with a suitably pre-set reference. During transport the sheet remains lifted in the front part that is gripped by the suction pads but is progressively made to adhere to the plane 1a in the remaining part towards the tail. The plane 1a is indeed connected to a vacuum pump system and the friction of the sheet created by the suction during movement ensures a perfect flatness preventing air bubbles or creases from forming on the sheet itself.

Once the sheet has been positioned on the suction work plane at the fine weeding station m, the gripper 3 can carry out the fine removal of the various (small) weed parts, including those created by the plurality of weeding assisting cuts, according to the instructions from the control system, in turn processed on the basis of technical criteria that shall be further explained hereafter.

The gripper 3 is represented in particular in FIGS. 3 to 7c and includes from top to bottom (the reference is at the work position in alignment with the axis Z) a damper 7 (FIG. 4) and a pinching or gripping head 8 (FIG. 5) adapted to come into contact with the adhesive film and to remove it through pinching and lifting, without of course affecting the liner support underneath. The damper 7 has the function of ensuring that the head 8 exerts a pressure with constant intensity on the material to be worked, compensating for possible non-homogeneity in shape of the suction plane, and makes use of a pre-loaded spring 9 that elastically opposes the movement of a stem 10, through which the damper is connected to the head 8, the stem being slidingly supported inside a base cylinder 11.

The head 8 moreover comprises an annular tool-holding flange 12 that can be coaxially connected in a reversible manner, with a quick fit system that can be driven pneumatically, at the aforementioned stem 10 of the damper 7. Once the flange is removed, it can be supported in a suitable manner on a tool changing station (replacement of jaws 16 and/or blocks 17 as detailed further on) through four pins 13 projecting radially from the flange itself. A support disc 14 is connected to the flange 12, again coaxially, on the opposite side of the stem 10, said support disc being in turn the support for a pneumatically driven self-centring chuck 15 equipped with three radial jaws 16 provided with respective pinching blocks 17 which represent the actual manipulation element of the film/weed to be removed.

The jaws 16 are thus driven by the self-centring chuck 15 that, when considered as such, has known mechanical characteristics. Through a base 16a of each jaw 16 the same jaws are linked with the chuck (FIG. 6); from the base 16a a strut 16b projects, and at the free end of the strut 16b a relative pinching block 17 is supported, preferably obtained through electric discharge so as to ensure a perfect mutual adherence of the three blocks when the self-centring chuck, and therefore the jaws, take up a radially locked end stop position (closed position).

The block 17 is kept aligned by two pins 18 that prevent the sliding along the axis X and Y, whereas the sliding along the axis Z is prevented by a plate 19 held by a screw 20.

Entering in greater detail as far as the shape of the pinching blocks 17 is concerned, said shape being particularly meaningful for one aspect of the invention, each block has two front facets 17a that extend parallel with respect to the axis Z, separated by an edge 17b, forming an angle, measured on the plane XY, of 120°. Those are indeed the faces that, by projecting frontally with respect to the strut 16a of the jaw 16, come into contact with one another causing the stop in the aforementioned closed position (shown in FIG. 3). The front facets 17a extend further in the direction Z at the lower side (the free one or pinching one) defining, in cooperation with an inclined wall 17c, a pyramid shaped projection at the top of which a contoured prism-like tip 17d forms the "finger" for gripping the material. Such a tip has an elevation, measured along the axis Z and with respect to the inclined wall 17c from which it branches off, in the order of some tenths of a millimetre, for example five, enabling it to sink into the adhesive plastic material without damaging the liner of silicone release paper underneath.

According to an embodiment shown in FIGS. 8 and 9, the fine weeding device comprises two or more grippers 3' that are supported in a carousel arrangement that allows for a greater work speed by hiding a discharge step of the weed pinched by a gripper, with respect to a fine weeding step carried out by another gripper. In the figures two grippers 3' can be noticed, mounted on a revolving support plate 41 that is driven into rotation around the axis Z (that in this case is no longer the central axis of a single gripper, but the axis of the gripper system as a whole), by an actuator 42. Moreover, the linear actuation system along Z is here indicated at 43. A shelf 44 can be also noted, supported by the crosspiece 5 and offering to the grippers 3', in their proximity, and in particular to the inactive gripper, the possibility to unload the weed previously pinched. Finally, a video-camera 45 and a lighting device 46 are represented, these additional components advantageously assisting the control of the fine weeding process, ensuring a correct centering of the sheet to be processed and a consequent high precision on the pinching points previously determined by the strategy set by the control software. Besides, the reference marks on the sheet can be focused and the conformity of the material to a standard quality evaluated, so that possible defective pieces are traced and do not proceed further to the weeding process.

The operation of this embodiment can be easily appreciated in particular from FIG. 9, that shows how in this case the support of the grippers 3' by the plate 41 is carried out with a further linear degree of freedom, according to directions Z' parallel with the axis Z. Such further degree of freedom is related with the weed unload function that indeed requires a reciprocating motion of lifting and lowering the gripper so as to leave the weed over the shelf. An elastic pusher 47 is secured with the plate 41 and acts on the tail of the gripper 3' in the pinching position to calibrate the force applied in the pinching step. Two springs 48 are associated with respective support guide for the reciprocating motion of the single grippers 3', being urged between the same grippers and the plate 41 in order to compensate for the variations in height due to the elevation of the weed collection plane (defined by the shelf) and to the accumulation of removed weed.

Particular self-adhesive materials may require, for a correct unloading, the provision of an air ejection through a nozzle (not shown) placed close to the jaws of the gripper and turned on as the weed is brought into contact with the unload surface, preventing that some parts may adhere to the surfaces of the gripper.

In operation, each fine weeding step thus occurs, in brief, with the positioning of the gripper on the appropriate coordinates XY, the jaws being in the open configuration. The device then goes down along the axis Z closing the jaws in a synchronised manner in order to complete the run as they come into contact with the weed to be removed, which is thus gripped between the tips 17d that are mutually tightened. This action causes there to be a first detachment of the weed, the removal of which is completed with a new lifting, not necessarily exactly vertical, in some cases and preferably preceded by a displacement along XY. By using the embodiment with the carousel arrangement, a new step as the one here just described is carried out getting rid of the waiting step necessary to the unload of the pinched/removed material, because the rotation of the plate 1 makes a free and active gripper immediately available while the other one unloads the material on the shelf 44, possibly provided with an adhesive, weed collection belt as indicated by the reference numeral 44a. In the absence of a carousel system the single gripper can carry out the unloading or discharge over a sliding belt made from consumable plastic or paper material, with an obvious configuration which is not shown.

Once the fine weeding phase is over, the sheet proceeds over the plane 1a and thus enters the already mentioned rough weeding station M in which a weed seizing head 21 of a rough weeding device operates (FIGS. 10 to 16), cooperating in an initial phase with a cutting system. The rough weeding device has the configuration of a crosspiece arranged along the axis Y above the plane 1a and it is supported in a mobile manner along the axis X by a lateral guide system 1c of the plane itself. An adjustment of the position along the axis Z can be also provided, through for example abutment screws to be actuated manually.

The head 21 comprises a front suction rod 23 that takes hold of the sheet and positions it above the cutting device, embedded in the plane 1a in an inlet position of the rough weeding station M. In this phase, the suction system of the rough weeding head 21 carries out an opposing effect to the action of a blade that moves along the axis Y, controlled by a pneumatic piston, through a recirculating ball slide on the entire length of a linear guide. The liner of silicone release paper placed under the self-adhesive plastic material is cut for its entire width at a distance of around 2.5 cm from the front edge of the sheet, so as to define a flap or edge that can be easily folded upwards, with the consequence and the aim that shall soon become clear. The precision with which the blade sinks into the liner is ensured by a micrometer screw, whereas the stop abutment of the knife is ensured by a pneumatic piston that brings a support disk of the blade in contact with the supporting plane of the sheet. The gap on the axis Z between the knife and the disk thus defines the depth of the cut.

Once the liner has been cut, the sheet still held by the suction rod 23 is brought inside the actual rough weeding station M, making the cutting line of the liner coincide with a reference mark of a device for lifting the head flap of the liner. Such a device is schematically represented and indicated with reference numeral 36 in FIGS. 17b to 17l, and it consists substantially of a bar that can be lifted along the axis Z through linear pneumatic actuators that are not represented, between a lowered position in which it is concealingly integrated inside the plane 1a and a raised position in which it is capable of folding upwards by 90° the front flap or edge of the sheet, defined by the cutting means indicated above.

The lifting strip is preferably shaped with a staggered or comb-shaped edge that engages with a matching shape of the rough weeding plane, so as to lift the flap or edge at the end margin of the suction area, i.e. with the suction that is in any case active between the teeth of the staggering/comb and assists a lift precisely by 90° of the flap or edge.

A further component of the weed seizing head is a blower 28 that, on a plane that is parallel and adjacent to the plane 1a, produces an ejection of pressurised air that is capable of covering the entire width (direction Y) and is directed according to X, in a direction that is in accordance with that along which the sheet advances forward. Advantageously, the blower 28, shown in particular in FIGS. 11 to 14, takes the shape of an elongated blade extending along the axis Y with a plurality of adjacent and independent sectors, for example ten, that are driven by respective solenoid valves 29 in order to dispense air, through suitable channels 28b, during the movement of the sheet only where actually required.

The pressurised air comes out from a system of front slits 28a of the blower, to which a pair of rollers 30, 31 are associated, spaced along the direction X and arranged so that the blade is substantially tangent with respect to them. More precisely, a rear roller 30 is made from silicone material, whereas a front roller 31 is preferably made from aluminium with a non-stick coating and is mobile towards and away from the rear roller 30. The rotation of such rollers is controlled by, and is synchronised with, the forward movement of the whole head, through a pinion and rack transmission (the pitch of the rack being in particular the same as the diameter of the two rollers).

In an upper area of the group, and therefore above the components described above, there are a pull drum 33 with an incomplete development (that is, without a circular sector preferably having an angle that is equal or slightly lower than 90°) and above the drum 33, a shaft 32 for collecting the weed in a reel (around a core of disposable cardboard), both motorized and arranged with their rotation axis extending along the axis Y. The motorisation of the roller and the shaft is mutually independent, with a torque limiter that can be set in order to ensure the correct tension of the weed, thus avoiding ripping or accumulation thereof. The shaft 32 can moreover translate towards and away from the pull drum 33.

The incomplete pull roll, indeed thanks to its C-shaped section, defines a radial face 33a that cooperates with a clamp member 35 so as to be able to lock the weed and pull it.

Figure 17A:
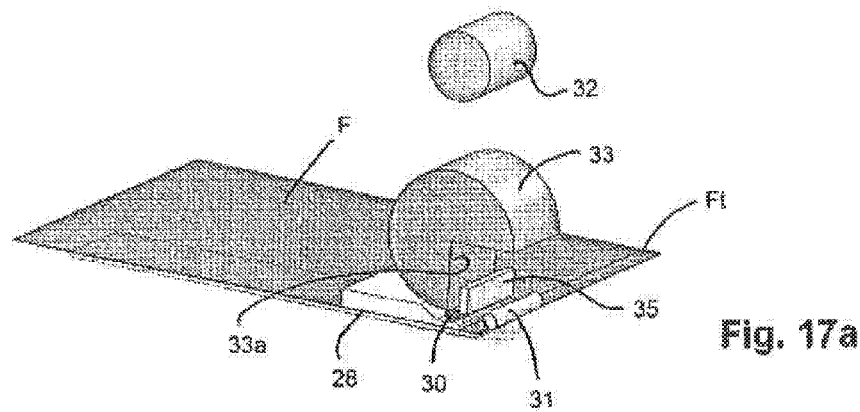
FIGS. 17a to 17j represent schematically respective subsequent stages of the rough weeding process.
Figure 17B:
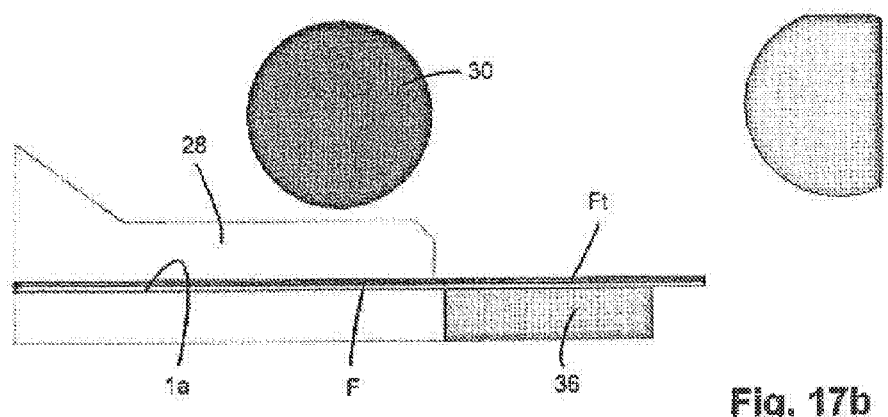

Entering into greater detail as far as the work sequence of the rough weeding process is concerned, and with particular reference to FIGS. 17a to 17j, the blower blade 28 is positioned at the front edge of the sheet, indicated with F. In FIG. 17a it can be noted also the folding flap Ft indeed generated frontally as a result of the half-cut previously mentioned (cutting line indicated with L). Initially, the radial face 33a of the C-shaped drum 33 is arranged perpendicular with the plane 1a, tangent to the back roller 30 and substantially aligned with the cutting line L. Also the front margin of the blower blade is positioned precisely in a way such as to coincide with the cutting line L. The clamp member 35 is open and the front roller 31 is in a forward displaced position (FIGS. 17a and 17b).

Figure 17C:
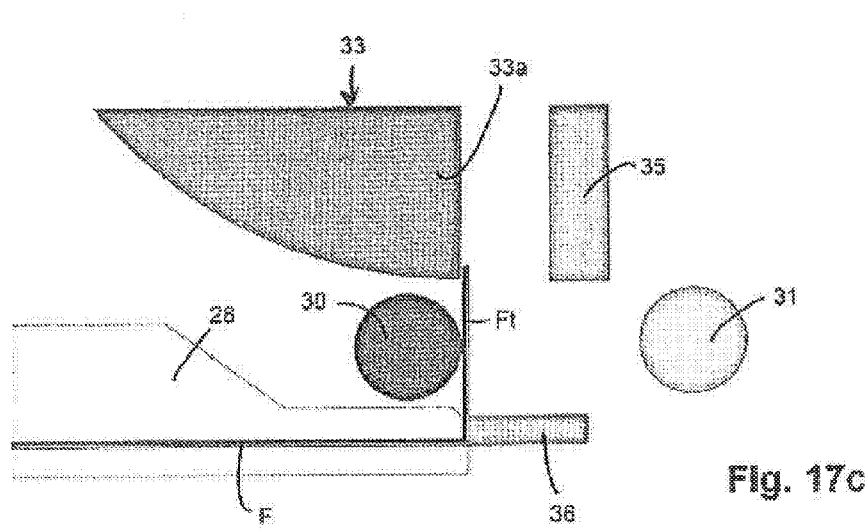
Figure 17D:
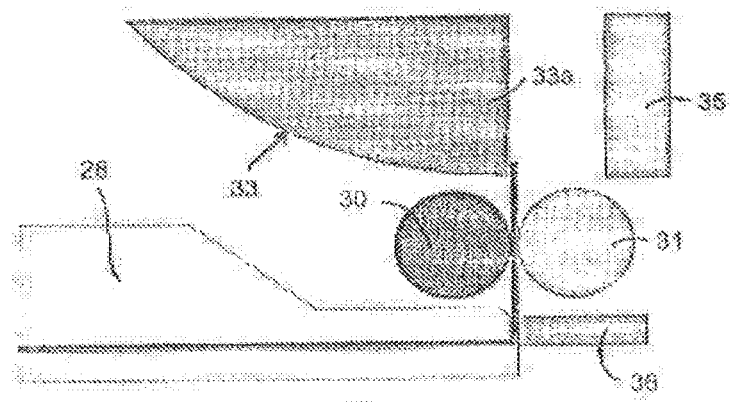
Figure 17E:
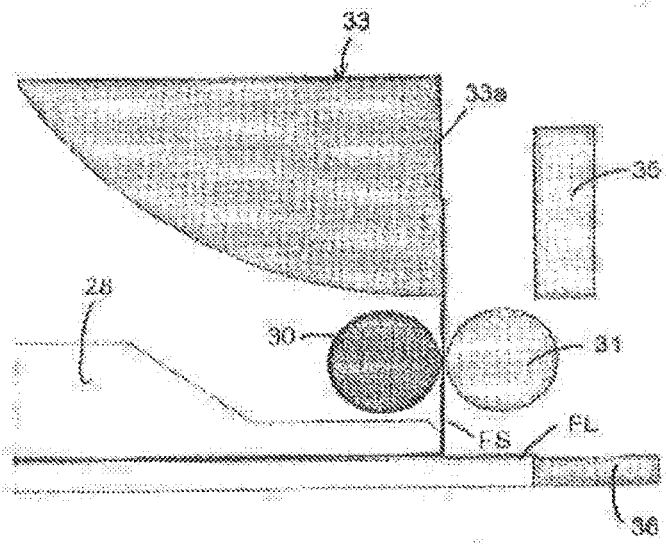

As a result of the lifting of the folder 36, the folding flap Ft, including both the weed Fs and the liner Fl joined to one another, is folded upwards (FIG. 17c). At this stage the front roller 31 retracts (FIG. 17d) and in cooperation with the rear roller 30 seizes the material, in contact with the adhesive side and directs it upward, whereas, at the same time, the head retracts in direction X, in opposite fashion to the advancement motion of the sheet (FIGS. 17d and 17e). While this occurs the weed Fs starts becoming detached from the liner of silicone release paper Fl, with the latter kept in contact with the plane 1a thanks to the suction exerted by it and to the jet of the blower 28 which is responsible for the function, useful in some cases, of preventing the lifting of small parts belonging to the graphics and that must indeed stay placed on the liner.

Figure 17F:
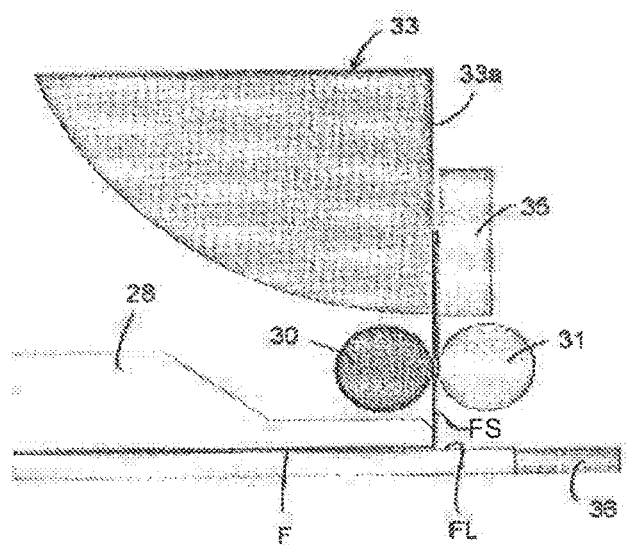
Figure 17G:
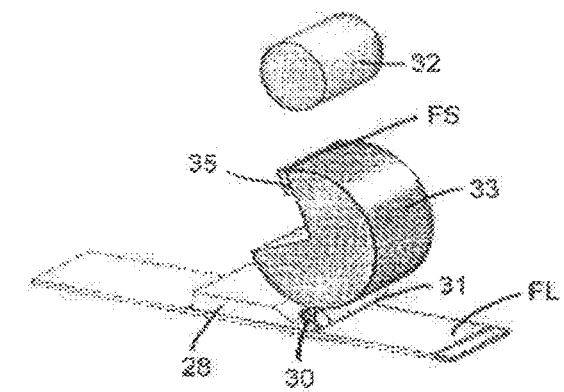
Figure 17H:
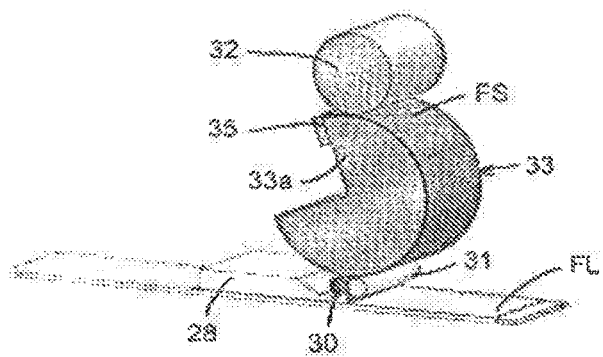
Figure 17I:
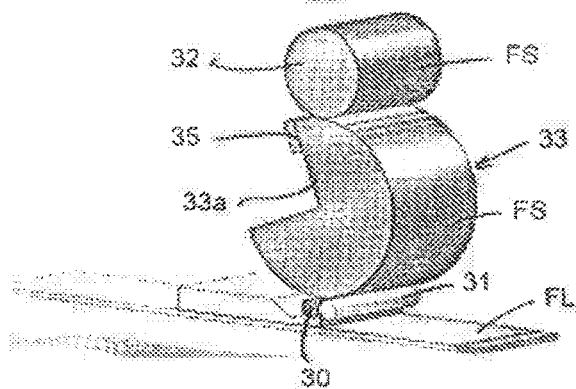
Figure 17J:
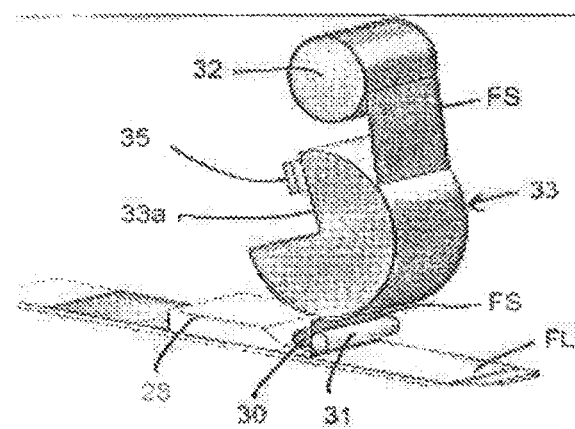

As visible from FIG. 17f, the weed Fs has been fed onto the radial face 33a of the pull drum 33 and the clamp member 35 can close to lock it. A rotation of the drum 33 at this stage continues the removal of the weed Fs which is circumferentially wound around the roll, while in a coordinated manner, the head unit continues to move rearwards. The rotation also brings the weed to the shaft 32 bearing the winding core. In order to start collecting, the shaft 32 moves tangentially alongside the drum 33 (FIG. 17h) so as to be, in turn, wrapped up by the same weed (FIG. 17i). Once the winding has been triggered, the winder can lift up so as to allow it to freely expand its diameter (FIG. 17j). Of course, for each treated sheet, the aforementioned sequence is repeated and the reel of collected weed continues to grow. Once the diameter of such a reel has reached a set size, a sensor detects it, and stops the apparatus so as to allow the reel itself to be extracted and replaced with an empty cardboard core.

The present invention provides therefore a device capable of making the fine weeding process effectively automatic, remarkably reducing the production times and significantly improving the productive results as far as costs and reliability are concerned.

The present invention has been here described with reference to its preferred embodiment. It should be understood that that there may be other embodiments within the same inventive concept, as defined by the scope of protection of the following claims.

The invention claimed is:

1. A device for the fine weeding of a multilayer sheet comprising a support liner and at least one adhesive film coupled with the liner, the film comprising a plurality of graphic elements peripherally encircled by cuts, and a weed among said graphic elements, the device comprising: a gripper with a pinching head having an axial-symmetric development around a central axis (Z, Z'), the head comprising a plurality of self-centering jaws radially movable close to and away from said central axis (Z), and respective pinching means for pinching and lifting portions of said weed, mounted on said jaws, wherein said pinching means comprise for each jaw respective blocks having front facets, protruding from the each jaw, the front facets of the respective blocks being adapted to mutually contact each other in a closed position of the head, and said front facets having an axial extension such that, in cooperation with a slanting wall of the block, a pyramidal projection is formed with a shaped prismatic tip for gripping the weed.

2. The device according to claim 1, wherein each of said tips has an elevation, measured along the axis (Z) of the device and starting from the slanting wall, comprised between three and eight tenths of millimeter.

3. The device according to claim 1, wherein three jaws mutually angled at 120° are provided, each block having a couple of front facets in turn forming an angle of 120° with each other.

4. The device according to claim 1, wherein said jaws are mounted on, and driven by, a self-centering chuck, the jaws having respective bases for connection with the chuck and struts that axially project from the bases for supporting, the struts having free ends supporting the respective blocks.

5. The device according to claim 1, wherein said pinching head is mounted on a damper adapted to ensure the exertion of a constant pressure on the multilayer sheet, the damper comprising elastic means elastically opposing the movement of a stem to which said head is connected.

6. The device according to claim 5, wherein said head comprises a ring-like tool supporting flange adapted to be coaxially and releasably connected to said stem of the damper, pegs being further provided radially projecting from the flange, whereby, once released from said stem, the flange is adapted to be held via said pegs in a tool replacement station.

7. The device according to claim 1, comprising: a sheet support plane; support means for said gripper adapted to keep the gripper substantially orthogonal with said support plane; drive means adapted to move said pinching head in a Cartesian orthogonal system (XYZ) defined by said plane and by said central axis (Z) orthogonal with the plane.

8. The device according to claim 7, comprising two or more grippers arranged in a carousel fashion to hide an unloading step of the removed weed by a gripper in an unloading position, with respect to another gripper in a pinching position, shelf means being further provided, integral with said support means and arranged to collect the weed that is gripped by said grippers.

9. The device according to claim 8, wherein said carousel arrangement comprises a revolving plate driven into rotation around an axis parallel with said central axis (Z') of each gripper by actuation means, said grippers being mounted on said revolving plate with a linear reciprocating degree of freedom along the respective central axis (Z') of the grippers.

10. The device according to claim 9, comprising an elastic pusher secured with said plate acting on a tail of the gripper in a pinching position to calibrate the force applied in the pinching step, springs being arranged between the grippers and said plate in order to compensate for variations in height between said pinching position and said unloading position.

11. The device according to claim 1, comprising air ejection means arranged to assist detaching the weed from the pinching means in an unloading stage.

12. The device according to claim 1, comprising or associated with an adhesive belt for collecting the weed that is gripped by the grippers.

* * * * *